(12) United States Patent
Azumai et al.

(10) Patent No.: US 6,320,682 B1
(45) Date of Patent: Nov. 20, 2001

(54) IMAGE FORMING APPARATUS

(75) Inventors: Mitsuo Azumai; Kouichi Takaki, both of Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/228,908

(22) Filed: Jan. 11, 1999

(30) Foreign Application Priority Data

Jan. 14, 1998 (JP) .................................................. 10-005426

(51) Int. Cl.[7] .................................................. H04N 1/46
(52) U.S. Cl. .......................... 358/509; 358/501; 358/481
(58) Field of Search .................................. 258/474, 481, 258/487, 489, 490, 491, 493, 296, 501; 382/312; 346/108

(56) References Cited

U.S. PATENT DOCUMENTS

| | | | | |
|---|---|---|---|---|
| 4,611,901 | * | 9/1986 | Kohyama | 355/4 |
| 4,833,503 | * | 5/1989 | Snelling | 355/259 |
| 5,043,744 | * | 8/1991 | Fantuzzo | 346/108 |
| 5,083,140 | * | 1/1992 | Peterson | 346/107 |
| 5,241,400 | * | 8/1993 | Itagaki | 358/401 |
| 5,305,023 | * | 4/1994 | Fukushige | 346/108 |
| 5,381,165 | * | 1/1995 | Lofthus et al. | 346/108 |
| 5,481,365 | * | 1/1996 | Arimoto | 358/296 |
| 5,627,649 | * | 5/1997 | Sawayama | 358/296 |
| 5,926,561 | * | 7/1999 | Utagawa | 387/166 |

FOREIGN PATENT DOCUMENTS

| | | | |
|---|---|---|---|
| 0 435 640 A2 | | 7/1991 | (EP) . |
| 0 810 768 A1 | | 12/1997 | (EP) . |
| 0810768A1 | * | 3/1997 | (EP) .............................. H04N/1/191 |
| 0435640 A2 | * | 3/1991 | (EP) .............................. H04N/1/46 |
| 59-171293 | | 9/1984 | (JP) . |
| 59-218419 | | 12/1984 | (JP) . |

* cited by examiner

Primary Examiner—Jerome Grant, II
(74) Attorney, Agent, or Firm—Frishauf, Holtz, Goodman, Langer & Chick, P.C.

(57) ABSTRACT

In an apparatus for forming multi-color image provided with a rotatable image carrying member and a plurality of image forming means each having a charging device, a scanning exposure device and a developing device; each scanning exposure device includes a beam generator and a polygonal mirror. The apparatus is further provided with a first sensor for detecting the beam passing at a start reference position on a peripheral surface of the rotatable image carrying member and for outputting a start reference signal; a second sensor for detecting the beam passing at an end reference position on the peripheral surface and for outputting a stop reference signal; and a controller to measure a time between the start reference signal and the stop reference signal and to control a frequency of clock pulses to transmit image signals for each scanning exposure device on the basis of the measured time of each scanning exposure device.

12 Claims, 12 Drawing Sheets

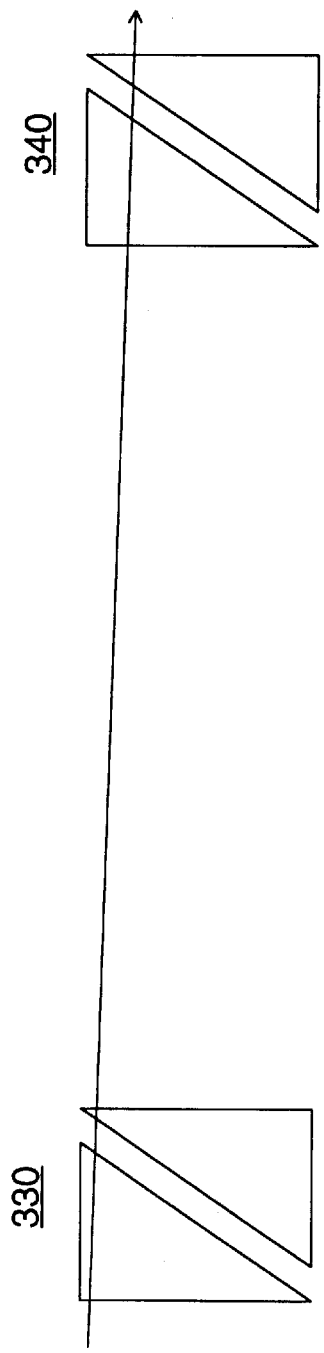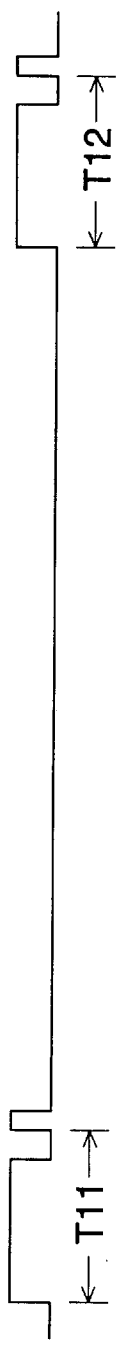
FIG. 12 (a)
FIG. 12 (b)

IMAGE FORMING APPARATUS

BACKGROUND OF THE INVENTION

The present invention relates to an image forming apparatus of a single pass color system (hereinafter referred to as SPC) in which color forming processes for plural colors are conducted while an image carrier makes one turn, and in particular, to an image forming apparatus wherein plural images each being of a different color can be superposed without positional deviation.

As an image forming apparatus of an SPC system in which the number of copies per a unit of time is increased, there has been proposed, for example, an image forming apparatus wherein four sets (equivalent to four colors) each being composed of a scorotron charger, a scanning optical system and a developing unit which are arranged at prescribed intervals around an image carrier (a photoreceptor drum or a photoreceptor belt) in its rotational direction are arranged, and a transfer unit, a separating unit, a cleaning unit and a fixing unit are further provided so that image forming processes for plural colors may be conducted while the image carrier makes one turn.

In the image forming apparatus of an SPC system wherein plural scanning optical systems are arranged around an image carrier in its rotational direction, it is necessary to prevent deviation in the main scanning direction or in the sub-scanning direction by correcting with various sensors mounted around the image carrier.

However, there are deviation in the mounting positions for various sensors and dispersion in exposure width in the main scanning direction for each color, and these are further subjected to the change with time. As a result, it has been impossible to prevent positional deviation in the main scanning direction or in the sub-scanning direction among plural images each being of a different color.

SUMMARY OF THE INVENTION

In view of the aforesaid technical problems, an object of the invention is to provide an image forming apparatus capable of conducting highly accurate positioning in the main scanning direction and in the sub-scanning direction on a real time basis for plural images each being of a different color.

The invention solving the problems mentioned above is represented by the following structures.

An apparatus for forming multi-color image, comprises:

a rotatable image carrying member having a peripheral surface;

a plurality of image forming means each having a charging device, a scanning exposure device and a developing device so that the plurality of image forming means form the multi-color image during a single rotation of the image carrying member on the peripheral surface;

each scanning exposure device of the plurality of image forming means including a beam generator and a polygonal mirror and controlled such that the polygonal mirror is rotated at the same rotational speed as that of the other scanning exposure devices and a beam scans the peripheral surface in an axial direction of the image carrying member;

a first sensor for detecting the beam passing at a start reference position on the peripheral surface and for outputting a start reference signal;

a second sensor for detecting the beam passing at an end reference position on the peripheral surface and for outputting a stop reference signal;

measuring means for receiving the start reference signal and the stop reference signal sequentially for each scanning exposure device and for measuring a time between the start reference signal and the stop reference signal; and control means for controlling a frequency of clock pulses to transmit image signals for each scanning exposure device on the basis of the measured time of each scanning exposure device.

Further, the object of the present invention may be attained by the following preferable structures.

Structure (1) An image forming apparatus which conducts image forming processes for plural colors while an image carrier makes one turn, and has therein a start position locating sensor that detects a position to start writing on the surface of the image carrier, an end position locating sensor that detects a position to end writing on the surface of the image carrier, an image forming member composed of a scanning optical system which conducts raster scanning by controlling so that the rotational speed of a polygon mirror may be the same, a charging unit and a developing unit, all arranged around the image carrier in its rotational direction, a time measuring means that measures an interval of time between a detection signal from at least one of the start position locating sensor and the end position locating sensor and an index signal from an index sensor provided on the scanning optical system, and a timing control means that controls exposure timing of the scanning optical system based on measured time coming from the time measuring means.

In the image forming apparatus stated above, it is possible to conduct positioning of an image for each color by controlling exposure timing by the use of at least one of the result of detection of the start position and the result of detection of the end position.

Structure (2) The image forming apparatus of Structure (1) wherein the time measuring means measures time between a detection signal from the start position locating sensor and a detection signal from the end position locating sensor, and there is provided a clock frequency control means which controls the clock frequency for image processing for exposure based on measured time coming from the time measuring means.

In the image forming apparatus stated above, it is possible to conduct positioning in the main scanning direction on an image of each color accurately for each pixel, because a clock frequency for image forming is controlled based on the time of main scanning between the start position and the end position.

Structure (3) The image forming apparatus of Structure (1) wherein a detection window means composed of either a reflection member or a transmission member is provided on the surface of the image carrier, and the start position locating sensor and the end position locating sensor conduct detection by receiving light from the detection window means.

In the image forming apparatus stated above, it is possible, due to the detection window means provided on the surface of the image carrier, to conduct positioning of an image in the main scanning direction and the sub-scanning direction by using scanning light of image forming.

Structure (4) The image forming apparatus of Structure (1) wherein a detection window means composed of either a reflection member or a transmission member is provided on the surface extended from the surface of the image carrier, and the start position locating sensor and the end position locating sensor conduct detection by receiving light from the detection window means.

In the image forming apparatus stated above, it is possible, due to the detection window means provided on the surface of the image carrier, to conduct positioning of an image in the main scanning direction and the sub-scanning direction by using scanning light of image forming, and to utilize the surface of the image carrier effectively.

Structure (5) The image forming apparatus of Structure (1) wherein there is provided a detection window means composed of either a reflection member or a transmission member wherein an edge of the main scanning starting side is not in parallel with that of the main scanning ending side, and the timing control means controls timing in the sub-scanning direction in accordance with a signal width obtained from the portion where the edge of the main scanning starting side and that of the main scanning ending side both of the detection window means are not in parallel with each other.

In the image forming apparatus stated above, it is possible to detect deviation of plural colors in the main scanning direction and the sub-scanning direction by the use of the detection window means having the edges which are not in parallel with each other.

Structure (6) The image forming apparatus of Structure (1) wherein there is provided a detection window means composed of either a reflection member or a transmission member wherein an edge of the main scanning starting side is not in parallel, and the timing control means controls timing in the sub-scanning direction in accordance with a signal width obtained from the portion where the edge of the main scanning starting side of the detection window means is not in parallel with each other.

In the image forming apparatus stated above, it is possible to detect deviation of plural colors in the main scanning direction and the sub-scanning direction by the use of the detection window means having the edges which are not in parallel with each other.

Structure (7) The image forming apparatus of Structure (1) wherein the time measuring means is equipped with a time measuring circuit which measures time in accuracy within one pixel clock and with a delay circuit which generates a clock wherein a phase is changed by 1/n within one pixel clock.

In the image forming apparatus stated above, it is possible to measure even timing that is less than one pixel clock.

Structure (8) The image forming apparatus of Structure (1) wherein the timing control means is equipped with a FIFO memory which adjusts exposure timing at a unit of a pixel clock and with a clock selection circuit which adjusts a phase of the pixel clock.

In the image forming apparatus stated above, the timing control means changes sending-out timing of image data in the main scanning direction to cope with deviation of rotational phase of a polygon mirror driven under the same clock. Accordingly, it is not necessary to make rotational phases of plural rotating polygon mirrors to be the same.

Structure (9) The image forming apparatus of Structure (1) wherein the scanning optical system is equipped with a fine adjustment prism which conducts fine adjustment of the exposure position within a pixel clock in the sub-scanning direction, and the fine adjustment prism is controlled by the timing control means.

In the image forming apparatus stated above, an exposure position in the sub-scanning direction is adjusted by the fine adjustment prism that is controlled by the timing control means. Due to this, deviation in the sub-scanning direction can be overcome.

BRIEF DESCRIPTION OF THE DRAWINGS

FIGS. 12(*a*) and 12(*b*) are illustrations showing the state of operations in an embodiment of the invention.

DETAILED DESCRIPTION OF THE PREFERRED EMBODIMENT

An embodiment of the invention will be explained in detail as follows.

First, the structure of an image forming apparatus used in an embodiment of the invention will be explained, referring to FIG. 2 and thereafter.

An image forming apparatus used in the present embodiment is of an electrophotographic system type, and it employs either a photoreceptor drum or a photoreceptor belt as an image carrier. An image forming apparatus employing the photoreceptor drum will be explained here.

Figure 2:
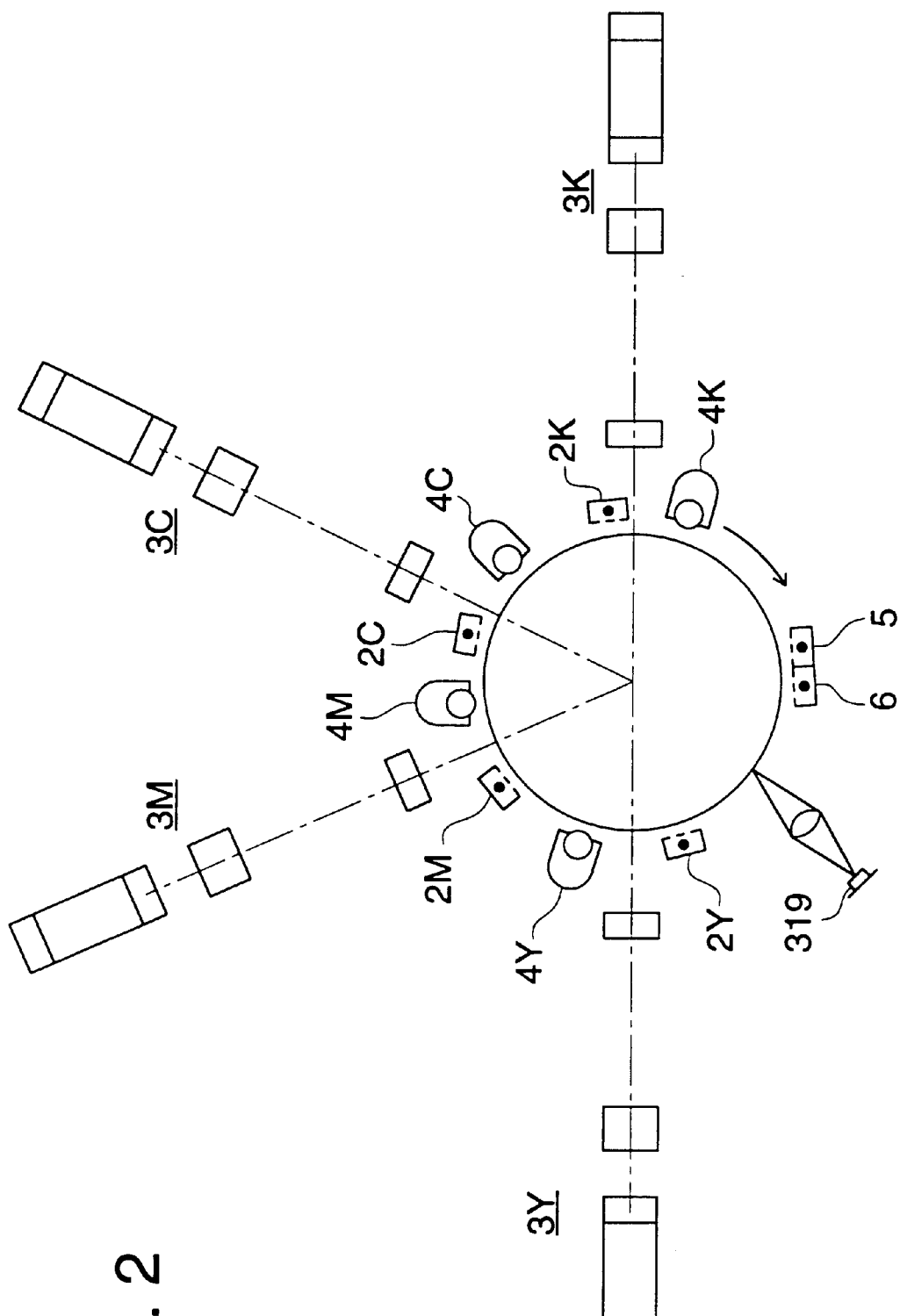
FIG. 2 is a structure diagram showing illustratively the sectional structure of an image forming apparatus used in an embodiment of the invention.

As shown in FIG. 2, there is provided drum-shaped image carrier 1 which rotates in the arrowed direction, and four sets each being composed of scorotron charger 2, scanning optical system 3 and developing unit 4 are arranged at prescribed intervals around the image carrier 1 in its rotational direction. What is shown here is an occasion where an image is formed with four colors representing Y (yellow), M (magenta), C (cyan) and K (black), and four sets of 2Y-3Y-4Y, 2M-3M-4M, 2C-3C-4C and 2K-3K-4K are arranged. There are further arranged transfer unit 5, separation unit 6, a cleaning unit (not shown) and a fixing unit (not shown) around image carrier 1.

Then, after the surface of the image carrier 1 is charged evenly, dot-shaped electrostatic latent images are formed by a spot light (laser beam) whose pulse width is modulated based on record signals modulated in accordance with digital image density data coming from a computer or a scanner. Then, a color toner image is formed on the image carrier 1 when four basic processes are repeated for four colors while the image carrier 1 makes almost one turn, in which the basic process is represented by a process wherein the electrostatic latent is subjected to reversal development that employs toner and thereby a dot-shaped toner image is formed.

Then, the color toner image is transferred by the transfer unit 5 onto a recording sheet which is then separated from the image carrier 1 by separation unit 6. After that, the toner image is fixed on the recording sheet by the fixing unit, thereby a color image is obtained. The foregoing is image forming carried out by an image forming apparatus of a single pass color (SPC) system.

Structures of the primary portions will be explained in detail as follows.

First, mechanical structures of the image forming apparatus in the present embodiment will be explained.

Image carrier 1 is composed of a conductive support, an intermediate layer and a photosensitive layer. A thickness of the photosensitive layer is about 5 $\mu$m–100 $\mu$m, and it preferably is 10–15 $\mu$m. The image carrier 1 employs a drum shaped conductive support which is made of aluminum and has a diameter of 150 mm, on which a 0.1 $\mu$m-thick intermediate layer made of ethylene-vinyl acetate copolymer is provided, a 35 $\mu$m-thick photosensitive layer is provided on the intermediate layer.

Figure 3:
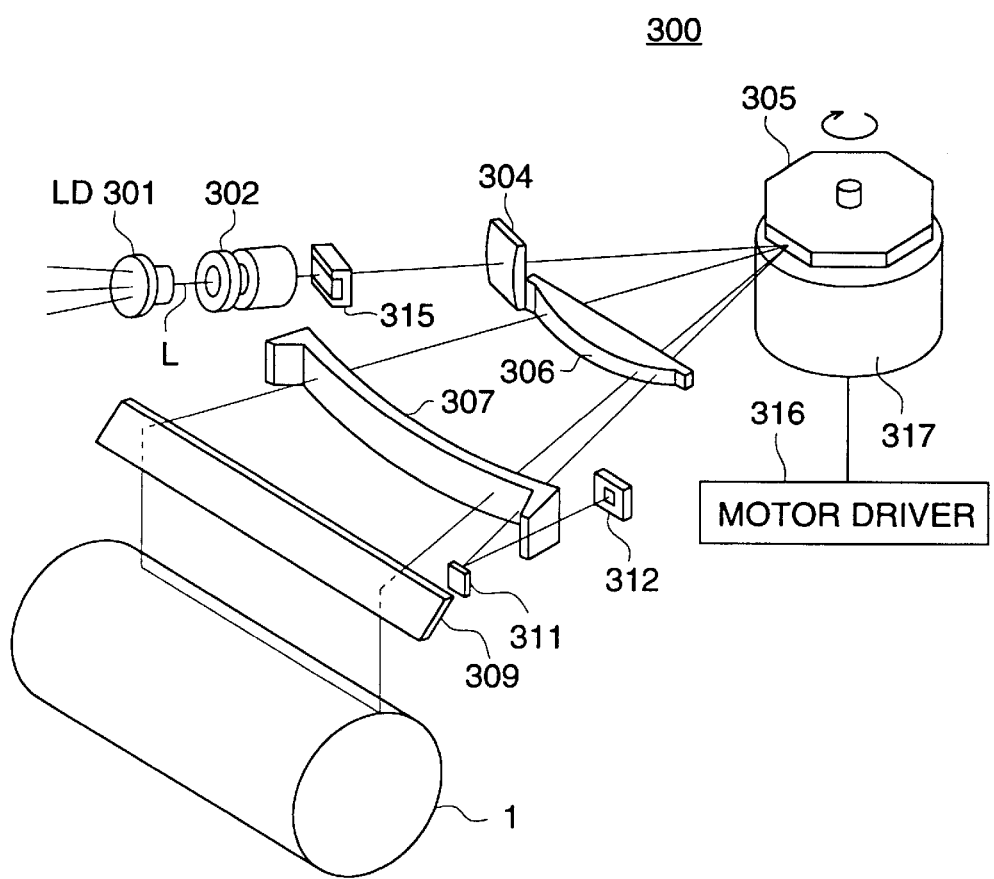
FIG. 3 is a perspective view showing illustratively the main portions of an image forming apparatus used in an embodiment of the invention.

Since four scanning optical systems 3Y, 3M, 3C and 3K are of the same structure, these will be explained as scanning optical system 300, with reference to FIG. 3 and thereafter. FIG. 3 is a perspective view showing the scanning optical system in the present embodiment.

The scanning optical system 300 is one which makes semiconductor laser 301 to emit light based on record signals as shown in FIG. 3, and thereby conducts line scanning on the image carrier 1 to form an electrostatic latent image.

Namely, the semiconductor laser 301 is made to oscillate by pulse-width-modulated record signals, then laser beam L emitted from the semiconductor laser 301 is collimated by collimator lens 302 to be a collimated beam which is then reflected on polygon mirror 305 rotating at the constant speed to be deflected, and is converged by fθ lens 306 and cylindrical lenses 304 and 307 to a fine spot on the image carrier 1 for scanning. Incidentally, the cylindrical lenses 304 and 307 are those to correct the fluctuation of spot positions which is caused by face slant of the polygon mirror 305.

Considering that color toner images are superposed on the image carrier 1, the semiconductor laser 301 is represented by a semiconductor laser having the spectral sensitivity on the infrared side so that a laser beam emitted from the scanning optical system 300 may not be intercepted by color toner images.

The polygon mirror 305 is one corresponding to the rotating polygon mirror described in Structure, and it is represented by an octahedral mirror in the present embodiment. Incidentally, it is also possible to use a polygon mirror which is different from the octahedral mirror in terms of the number of mirror faces.

Index sensor 312 senses a beam reflected on reflecting mirror 311 and outputs electric current which is then subjected to current/voltage conversion in index detection circuit 313 to be outputted as an index signal.

This index signal detects a position of a face of a polygon mirror rotating at the prescribed speed, whereby optical scanning by modulated signals is conducted by a cycle in the main scanning direction through the raster scanning system. The index signal is supplied to time measuring circuit 400 which controls optical scanning timing of the scanning optical system 300.

Prism 315 represents a main part of the fine adjustment prism described in the Structure, and it primarily is a prism which compresses, in the prescribed direction, a laser beam representing a collimated beam obtained by converging with collimator lens 302, and it can adjust the scanning position in the sub-scanning direction when it is structured as will be stated later in the present embodiment.

Motor driver 316 sends out PLL-controlled driving clocks to polygon motor 317 for the purpose of stabilizing the rotational speed of polygon mirror 305. Microprocessor 320 sends out clocks with the same cycle to four motor drivers 316Y–316K so that polygon mirrors 305 forming four scanning optical systems 3Y–3K may rotate at the same rotational speed.

In the present embodiment, a cycle of the driving clock is twice that of the rotational speed of polygon mirror 305 for the purpose of stabilizing the rotational speed of the polygon mirror 305.

Incidentally, when the same driving clocks are given and thereby the polygon mirrors are rotated at the same rotational speed, rotary phase does not need to be the same.

Figure 4:
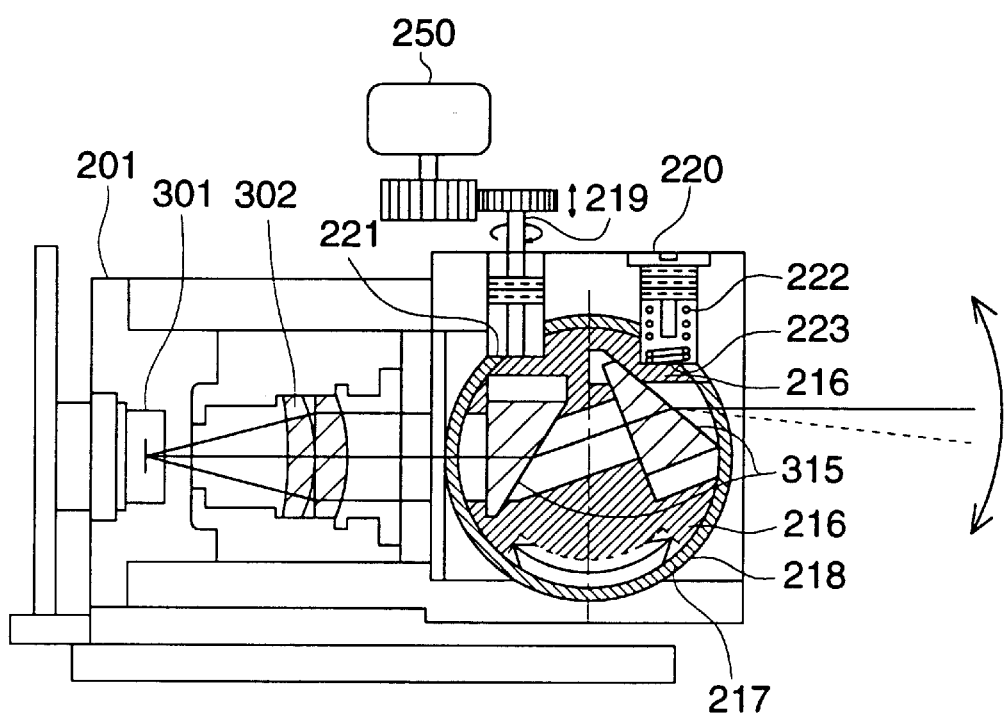
FIG. 4 is a sectional view of an optical system including a prism for position adjustment in the sub-scanning direction in an embodiment of the invention.

FIG. 4 is a sectional view of an optical system including prism 315 for adjusting positions in the subscanning direction in the present embodiment. Incidentally, the structure shown in FIG. 4 corresponds to the fine adjustment prism described in the Structure.

The prism 315 is attached on prism mounting member 216 at the prescribed angle. The prism mounting member 216 is fixed on a cylindrical frame body (not shown), and the cylindrical frame body is mounted on prism mounting body 218 formed in casing 201, to be capable of rotating in the direction for crossing light beam L. On a part of the cylindrical frame body, there are provided screw rods 219 and 220 which are screwed in the casing 201 to be symmetrical laterally, and the tip of the screw rod 219 is brought into direct contact with stepped portion 221 formed on the cylindrical frame body 217, while the screw rod 220 on the other side is brought into contact with stepped portion 223 formed on the cylindrical frame body 217 through spring member 222 to be fixed.

As stated above, the screw rod 219 is rotated when rotating force of step motor 250 is transmitted through gears 151 and 252, and thereby the prism 315 structured on the casing 201 is adjusted. In that case, the stepped portion 221 formed on the cylindrical frame body 217 is caused by spring member 222 to be constantly in contact with the tip of the screw rod 219, and when the screw rod 219 rotates for adjustment, the prism 315 makes rotary adjustment for the sub-scanning direction while reducing light beam L to the prescribed width, through the cylindrical frame body 217 and prism mounting member 216. After completion of adjustment, the tip of the screw rod 219 is constantly blocked by the stepped portion 221 formed on the cylindrical frame body 217, thus, no deviation from the adjusted position is caused.

Figure 5:
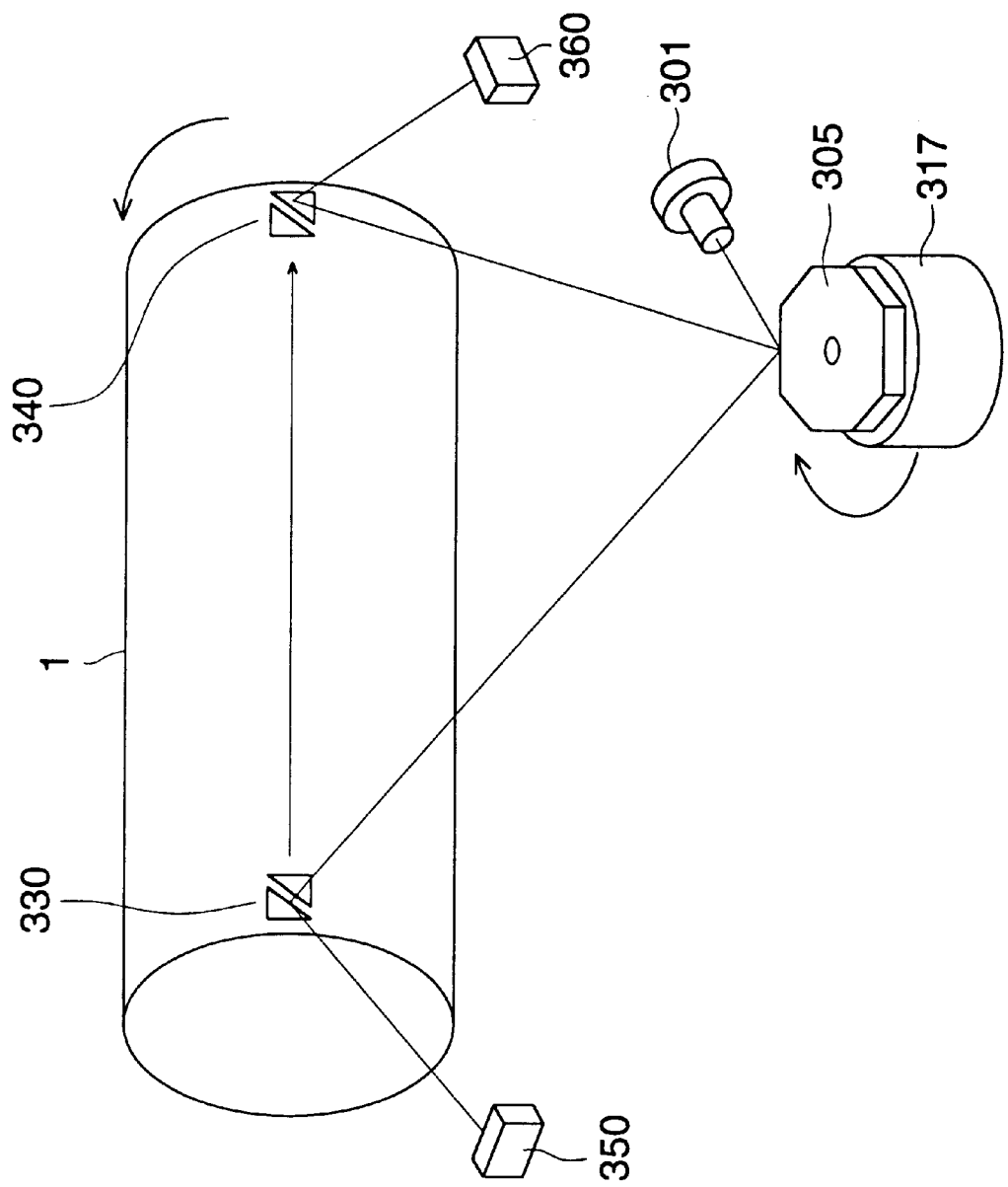
FIG. 5 is a structure diagram showing the arrangement of a detection window section, a start position locating sensor and an end position locating sensor in an embodiment of the invention.

Next, detection window sections 330 and 340, start position locating sensor 350 and end position locating sensor 360 in the present embodiment will be explained as follows, referring to FIGS. 5 and 6. In FIG. 5, various lenses of scanning optical system 300 are not shown, but surroundings of image carrier 1 are shown.

FIG. 5, the numeral 330 represents a detection window section structured on the surface of image carrier 1 with a reflection member or a transmission member, 340 represents a detection window section structured on the surface of image carrier 1 with a reflection member or a transmission member, 350 represents a start position locating sensor which detects the position of start writing on the surface of image carrier 1 and 360 represents an end position locating sensor which detects the position of the end of writing on the surface of image carrier 1.

The start position locating sensor 350 is used as the first sensor to detect the beam passing as the start reference position and the end position locating sensor 360 is used as the second sensor to detect the beam passing as the end reference position.

Incidentally, even in the case of the start position locating sensor 350 and the end position locating sensor 360, each of them is arranged to match scanning optical system 300 for each color of Y, M, C and K.

Each of the aforesaid detection window section and the locating sensor is one which detects scanning positions of beams projected on image carrier 1 from plural scanning optical systems.

The detection window sections 330 and 340 stated above may also be provided on the line extended from the surface of the photosensitive layer of image carrier 1, for example, on frames provided on both sides of the photosensitive layer, in addition to providing on neighborhoods of edges of the surface of image carrier 1.

Figure 6:
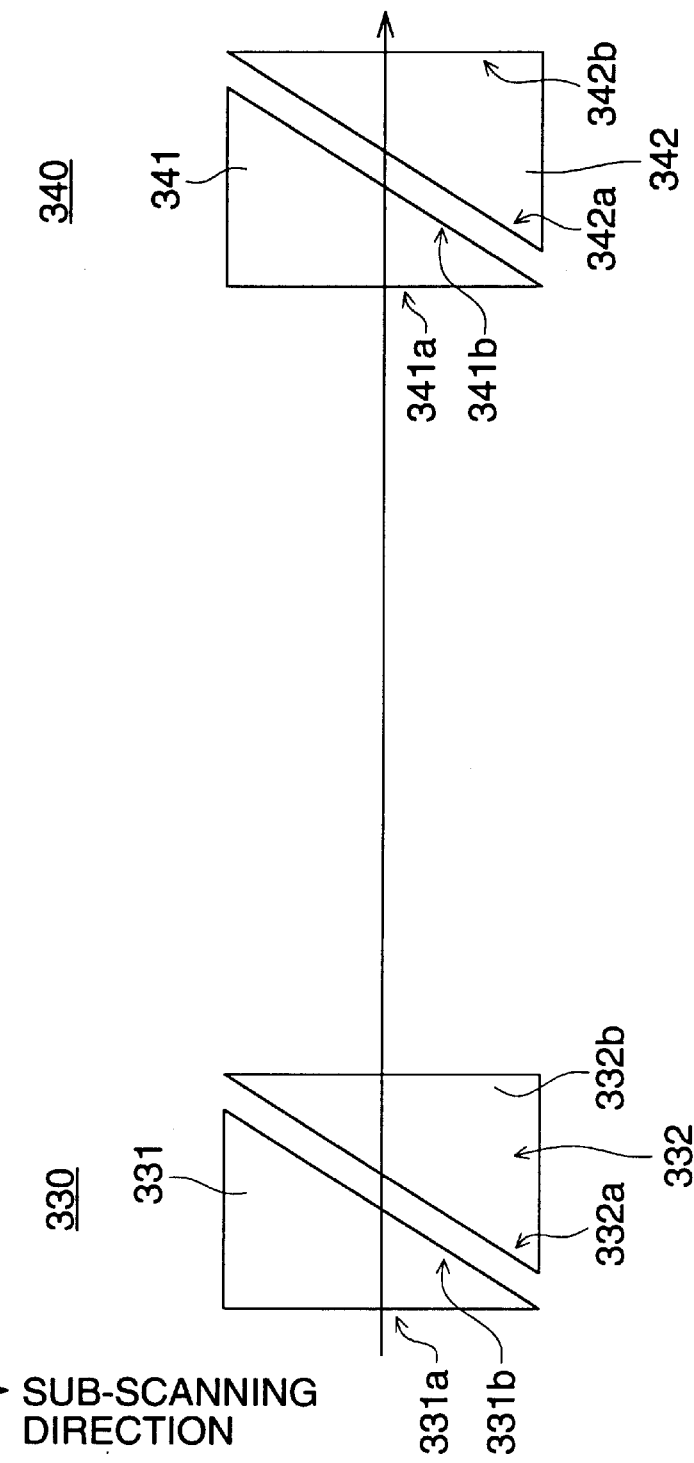
FIG. 6 is a structure diagram showing an arrangement of a detection window section in an embodiment of the invention.

FIG. 6 shows an example wherein the detection window section is composed of a reflection member, and detection window section 330 is composed of triangular reflection member 331 and triangular reflection member 332. Further, detection window section 340 is composed of triangular reflection member 341 and triangular reflection member 342.

In this case, edge 331a of the reflection member 331 on the part of a starting side for main scanning is formed to be in parallel with sub-scanning direction on the surface of image carrier 1. Edge 331b of the reflection member 331 on the part of an ending side for main scanning is formed not to be in parallel with the aforesaid edge 331a on the surface of image carrier 1. Edge 332a of the reflection member 332 on the part of a starting side for main scanning is formed not to be in parallel with edge 332b stated later and to be inclined from the sub-scanning direction, on the surface of image carrier 1. Further, edge 332b of reflection member 332 on the part of an ending side for main scanning is formed on the surface of image carrier 1 to be in parallel with the sub-scanning direction.

Now, edge 341a of the reflection member 341 on the part of a starting side for main scanning is formed to be in parallel with sub-scanning direction on the surface of image carrier 1. Edge 341b of the reflection member 341 on the part of an ending side for main scanning is formed not to be in parallel with the aforesaid edge 341a on the surface of image carrier 1. Edge 342a of the reflection member 342 on the part of a starting side for main scanning is formed not to be in parallel with edge 342b stated later and to be inclined from the sub-scanning direction, on the surface of image carrier 1. Further, edge 342b of reflection member 342 on the part of an ending side for main scanning is formed on the surface of image carrier 1 to be in parallel with the sub-scanning direction.

Here, "a reflection member wherein an edge of the main scanning starting side is not in parallel with that of the main scanning ending side" means that edge 331a is not in parallel with edge 331b or edge 341a is not in parallel with edge 341b in FIG. 6.

Again, "a reflection member wherein an edge of the main scanning starting side is not in parallel" means that edge 331a is not in parallel with edge 332a or edge 341a is not in parallel with edge 342a in FIG. 6.

Incidentally, when a diameter of a laser beam for exposure is about 60 mm, as an example, it is preferable that each of the detection window sections 330 and 340 is in size of 10 mm in the main scanning direction and 5 mm in the sub-scanning direction.

Without being limited to the foregoing, a shape other than the above is acceptable provided that a reflection member is surrounded by edges which are not in parallel with each other. Even for a diameter of the laser beam and a size of the detection window section, sizes exceeding these sizes may also be acceptable.

In FIGS. 5 and 6, there is shown the structure wherein light reflected from detection window section 330 composed of reflection members is detected by start position locating sensor 350 which is assumed to be equipped with a photosensor having a sufficient size to pick up reflected light surely. In the same way, there is shown a structure wherein light reflected from detection window section 340 composed of reflection members is detected by end position locating sensor 360, and the end position locating sensor 360 is assumed to be equipped with a photosensor which has a sufficient size to pick up reflected light surely. Incidentally, it is also possible to provide on the front side of the photosensor an optical system such as a converging lens which can pick up reflected light surely, without making the photosensor itself to be greater. In this case, it is necessary to consider divergence of reflected light caused by the reflection member and dispersion in mounting.

Though the structure in this case employs a detection window section composed of a reflection member and a locating sensor which detects reflected light, it is also possible to employ an arrangement wherein a through hole (transmission member) having a shape corresponding to the detection window section is provided on image carrier 1, and a locating sensor provided in the image carrier 1 detects light transmitted through the transmission member. When using the transmission member as in the foregoing, one set of locating sensor is enough.

Here, an electrical structure of a scanning control circuit which controls scanning operation of the scanning optical system 300 stated above will be explained.

Figure 1:
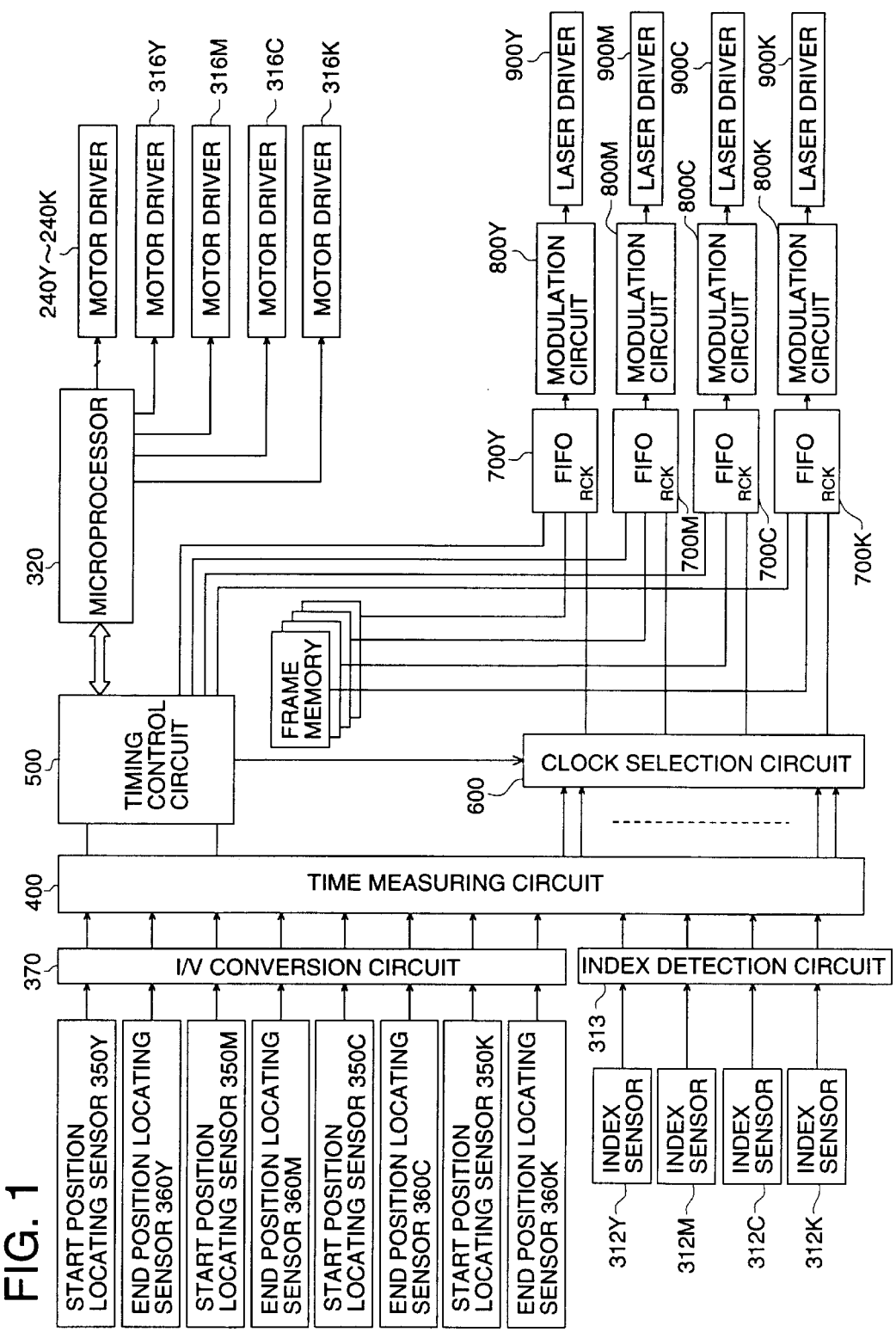
FIG. 1 is a block diagram showing each function block in the electric structure of an image forming apparatus used in an embodiment of the invention.

FIG. 1 is a block diagram showing an embodiment of a scanning control circuit used in an image forming apparatus in the present embodiment.

The scanning control circuit in the present embodiment is a circuit which controls scanning operations of plural scanning optical systems 300 which materialize an SPC system wherein no control is conducted for phase matching of plural polygon mirrors.

To be concrete, accurate registration for plural images each having a different color is conducted on a real time basis in both the main scanning direction and the sub-scanning direction, for each image of each color of Y, M, C and K, by the use of detection signals from start position locating sensors 350Y–350K and end position locating sensors 360Y–360K.

First, a phase difference of plural polygon mirrors 305Y–305K which rotate at the same rotational speed through PLL control is measured by time measuring circuit 400, then step motor 250 in FIG. 4 is driven by microprocessor 320 and motor driver 240 to conduct the control in the sub-scanning direction which is more fine than one line. Incidentally, this control in the sub-scanning direction is only needed when starting an apparatus or needed at regular intervals.

In addition, control in the main scanning direction which is more fine than one pixel clock is conducted by driving time measuring circuit 400, timing control circuit 500, clock selection circuit 600, first-out first-read memory in (hereinafter referred to as FIFO) 700, modulation circuit 800 and laser driver 900 by the use of results of detection at start position locating sensor 350 and end position locating sensor 360.

The structure of each section will be explained as follows.

Since schematic structures of index sensors 312Y–312K and index detection circuit 313 have been explained with reference to FIG. 3, repeating explanation will be omitted.

Since start position locating sensors 350 (350Y–350K) and end position locating sensors 360 (360Y–360K) have also been explained with reference to FIG. 5, repeating explanation will be omitted.

I/V conversion circuit 370 conducts I/V conversion (current/voltage conversion) for output current from start position locating sensors 350 (350Y–350K) and end position locating sensors 360 (360Y–360K), and sends them to time measuring circuit 400.

The time measuring circuit 400 is one which measures in accuracy that is more fine than one pixel clock by the use of pulses detected from start position locating sensor 350 and end position locating sensor 360 and pulses detected from four index sensors 312Y–312K.

The time measuring circuit 400 generates delay clocks in "n" types by delaying pixel clock by 1/n cycles by the use of digital delay line (TOKUGANHEI 4-16552). Due to this, the time measuring circuit 400 outputs delay clock dli which is delayed at plural steps in one cycle to clock selection circuit 600.

Timing control circuit 500 is one which determines selecting operations of clock selection circuit 600 and driving timing for FIFO 700 by the use of time difference signals from time measuring circuit 400.

Clock selection circuit 600 sends out some delay clocks dli from delay clocks dl1–dln obtained by delaying pixel clocks sent out from time measuring circuit 400 in plural steps, in which the relation of 1≦i≦n is satisfied.

FIFO 700 is one which sends out digital image data to modulation circuit 800 by delaying with the timing established by timing control circuit 500 based on delay clock dli obtained by phase-adjusting within a pixel clock.

The modulation circuit 800 is one obtained by incorporating in one package the circuit structures for modulating a pulse width and by converting them into IC, and it sends to laser driver 900 the modulation signals (recording signals) obtained by differential-amplifying analog image density signals obtained by D/A-converting digital image density data and by differential-amplifying reference wave signals.

Laser driver 900 is one which makes a semiconductor laser to oscillate with modulated signals, and it drives so that quantity of light from the semiconductor laser may be constant when signals corresponding to quantity of beam light from the semiconductor laser are fed back, in which an electric current sent to the semiconductor laser can be changed. Due to this, it is possible to adjust latent image voltage.

Microprocessor 320 is one which gives an instruction to PLL control of a motor driver which will be stated later, based on signals from time measuring circuit 400 and from timing control circuit 500.

Motor drivers 240Y–240K represent one which gives PLL-controlled driving clocks to step motor 250 in FIG. 4 and thereby conducts controls in the sub-scanning direction which is more fine than one line.

Motor drivers 316Y–316K represent one which sends out clocks with the same cycle for the purpose of rotating polygon mirrors 305Y–305K respectively of four scanning optical systems 3Y–3K.

FIG. 4 is a time chart illustrating the following operations.

Detection and adjustment of a main scanning length for each color

Detection and fine adjustment of a sub-scanning position deviation for each color FIGS. 7(a)–7(j) show detection signals at index sensors 312Y–312K, detection signals at start position locating sensor 350Y, detection signals at end position locating sensor 350Y, detection signals at start position locating sensor 350M, detection signals at end position locating sensor 350M, detection signals at end position locating sensor 350M, and the state of operations of Y and M.

Figure 7:
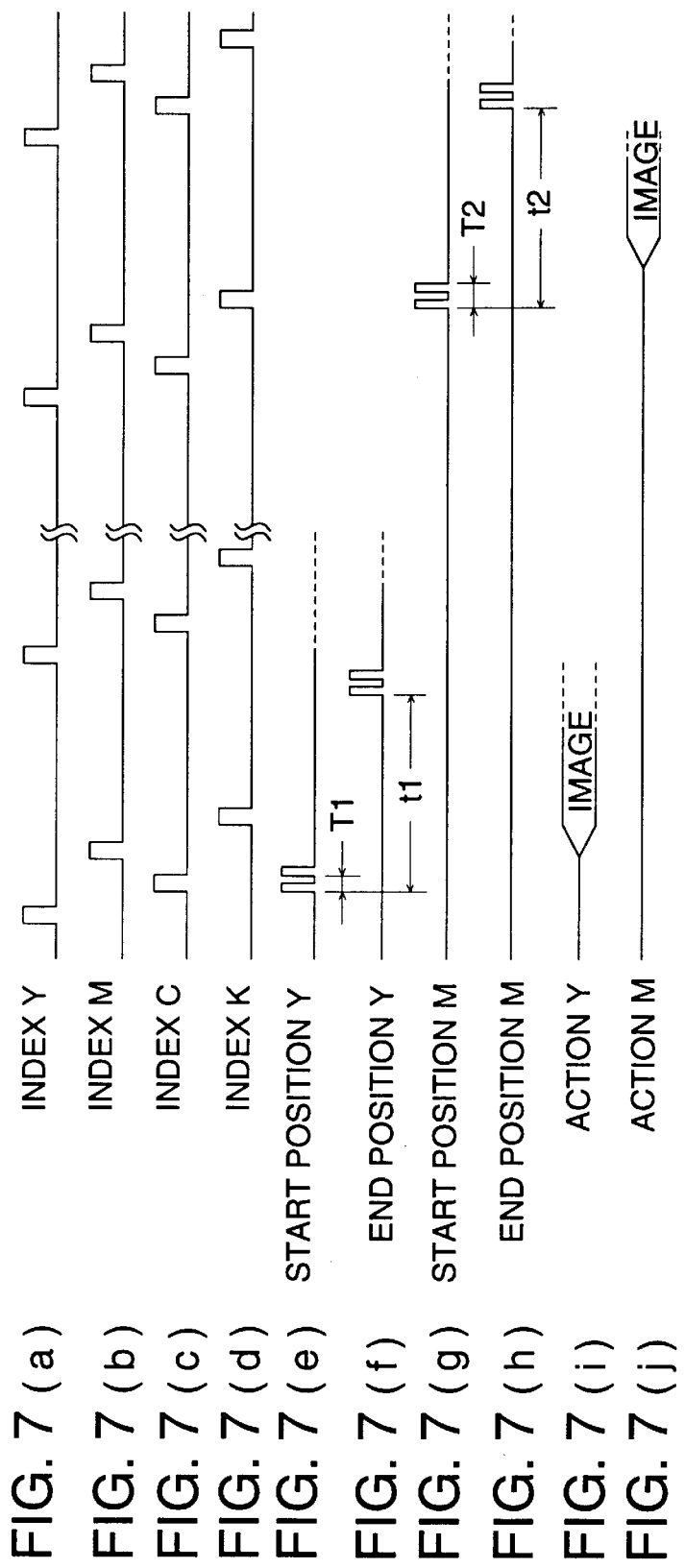
FIGS. 7(*a*) to 7(*j*) are time charts showing the state of operations in an embodiment of the invention.

Now, two pulses shown in FIG. 7(e) are obtained as start position Y by detection window section 330 and start position locating sensor 350Y. Interval T1 between risings of these two pulses is measured by time measuring circuit 400.

Further, two pulses shown in FIG. 7(f) are obtained as end position Y by detection window section 340Y and end position locating sensor 360Y. Now, interval T1 between rising of a pulse in the first half of start position Y and rising of a pulse in the first half of end position Y is measured by time measuring circuit 400.

In the same way, two pulses shown in FIG. 7(g) are obtained as start position M by detection window section 330 and start position locating sensor 350M. Interval T2 between risings of these two pulses is measured by time measuring circuit 400.

Further, two pulses shown in FIG. 7(h) are obtained as end position M by detection window section 340M and end position locating sensor 360M. Now, interval t2 between rising of a pulse in the first half of start position M and rising of a pulse in the first half of end position M is measured by time measuring circuit 400.

In the same procedures, T3, t3, T4 and t4 are further obtained and are measured by time measuring circuit 400, though these are not shown.

Incidentally, measurement by time measuring circuit 400 is conducted by the sum total of the number of clocks counted in that period and a phase difference which is less than one clock (to obtain by the number with agreed timing by using delay output in quantity of n each having different phase).

Time t1, t2, t3 and t4 thus obtained respectively have values each being proportional to a main scanning length for each color of Y, M, C and K.

Therefore, a clock having a desired frequency is selected from clock selection circuit 600 so that the clock number at t1 may be the same as that at each of t2, t3 and t4. Then, each clock is supplied to FIFO 700Y–700K.

By doing as stated above, the problem of deviation in the main scanning direction can be solved, because each color of Y, M, C and K has the same clock number in a range from the end portion of detection window section 330 to the end portion of detection window section 340. Namely, accurate registration can be conducted in spite of difference in main scanning length caused by various deviation of scanning optical system for each color.

Next, phase adjustment operations in the main scanning direction will be explained.

As stated above, the number of revolutions for each of plural polygon mirrors is the same because they are driven by the same clock. Therefore, phase adjustment is conducted by changing the timing for sending image data in the main scanning direction in accordance with deviation of rotational phase, without making the rotational phases of plural polygon mirrors to be the same.

FIGS. 8(a)–8(e) are time charts showing operations of phase adjustment in the main scanning direction.

Figure 8:
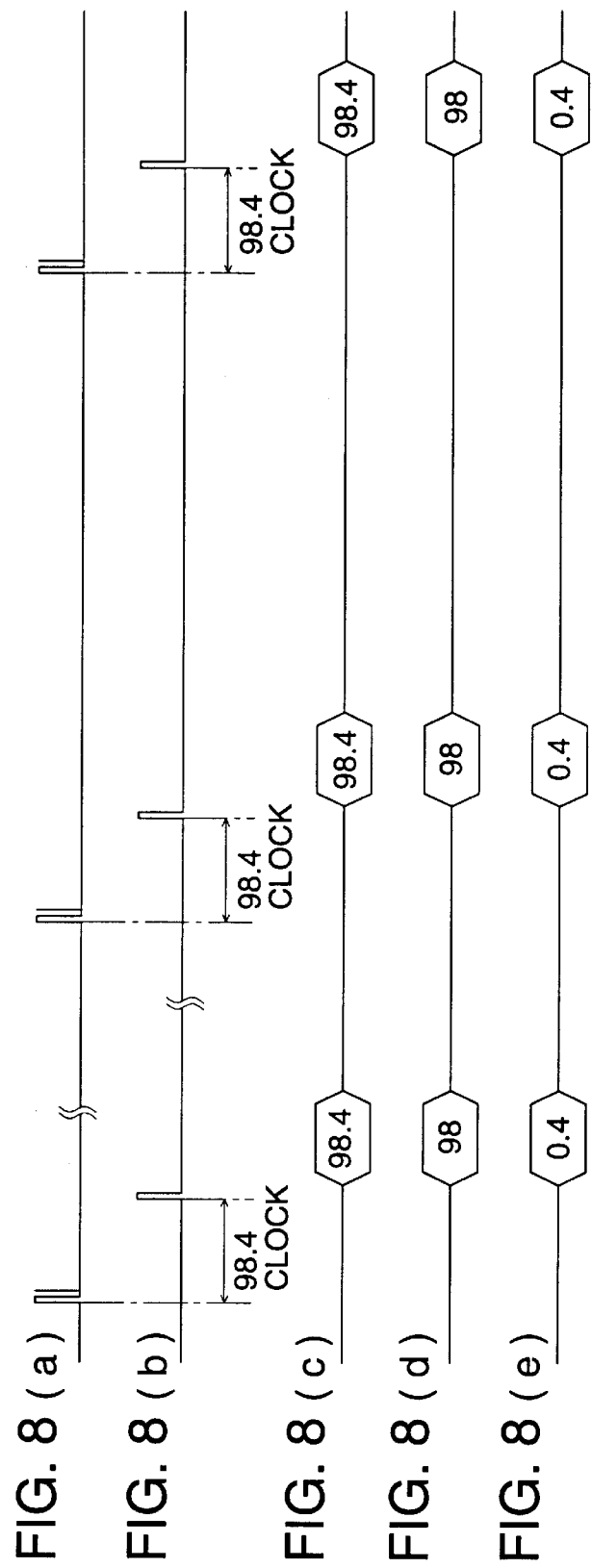
FIGS. 8(*a*) to 8(*e*) are time charts showing the state of operations in an embodiment of the invention.

FIG. 8(a) shows pulses obtained by detecting detection window section 330 shown in FIG. 5 with start position locating sensor 350, and no detection is made actually after the scanning for several tens of lines for each color. FIG. 8(b) shows index signals sent out from index sensor 312Y.

FIG. 8(c) shows data of phase difference between rising of the front end of the pulse measured by time measuring circuit 400 and shown in FIG. 8(a) and rising of the pulse shown in FIG. 8(b), wherein what is suited to the number of clocks is measured by the time measuring circuit 400.

Incidentally, measurement by time measuring circuit 400 is conducted by the sum total of the number of clocks counted in that period and a phase difference which is less than one clock (to obtain by the number with agreed timing by using delay output in quantity of n each having different phase).

FIG. 8(d) represents data showing the latch time at FIFO 700.

FIG. 8(e) shows data which designate selection operations of clock selection circuit 600, and select adjustment time within one pixel clock.

Incidentally, in the present embodiment, it is preferable to use an average value obtained by excluding the maximum value and the minimum value from values in the results of plural measurement, in view of dispersion in measurement and dispersion of polygon surfaces.

By doing the foregoing, FIFO 700 sends digital image data to modulation circuit 800 by delaying with the timing established by timing control circuit 500 based on the delay clock which has been subjected to phase adjustment within a pixel clock. Accordingly, phase adjustment is conducted by changing the timing for sending image data in the main scanning direction in accordance with deviation of rotational phase, without making the rotational phases of plural polygon mirrors to be the same.

Next, there will be explained operations of fine adjustment for positional deviation of a beam in the sub-scanning direction in the scanning control circuit of the present embodiment.

The scanning control circuit in the present embodiment uses detection window section 330 and start position locating sensor 350 (350Y–350K) shown in FIGS. 5 and 6 to obtain, as explained using FIGS. 7(a)–7(j) interval T1 between risings of two pulses for start position Y, T2 between risings of two pulses for start position M, T3 between risings of two pulses for start position C and T4 between risings of two pulses for start position K which are then measured respectively by time measurement circuit 400, in terms of the number of clocks corresponding to each interval.

In this case, when a laser beam that passes through detection window section 330 first for each color is deviated to the sub-scanning direction, pulse widths for T1–T4 are detected to be different from each other, because edges on the starting side of main scanning shown in FIG. 6 (edge 331a and edge 332a) are not in parallel with each other.

Figure 9:
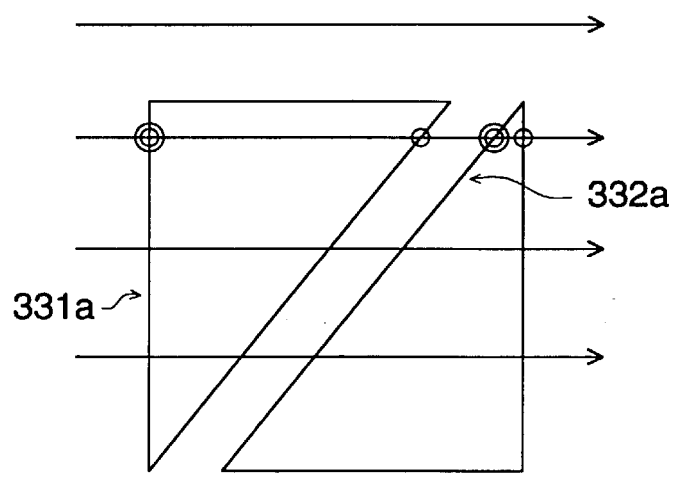
FIGS. 9(*a*) to 9(*d*) are time charts showing the state of deviation in the sub-scanning direction in an embodiment of the invention.
Figure 9:
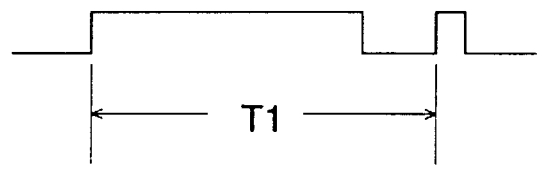
Figure 9:
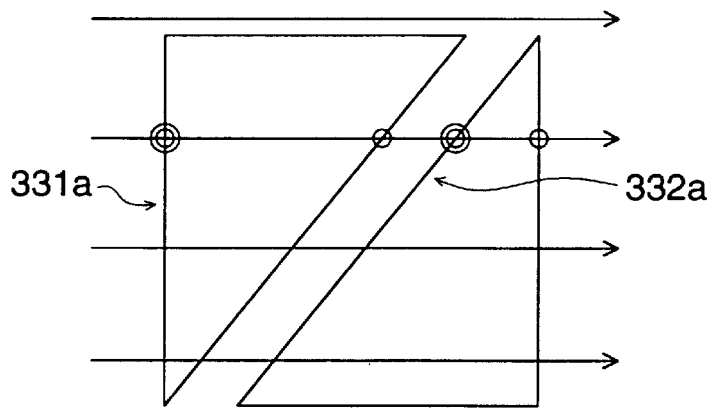
Figure 9:
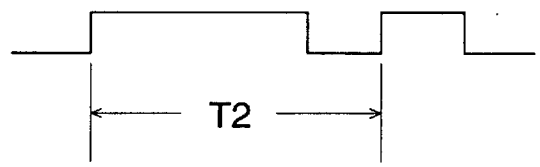

FIG. 9(a) shows an example wherein a laser beam of Y passes through detection window section 330, and T1 obtained in that occasion is shown in FIG. 9(b). FIG. 9(c) shows how the laser beam of M deviated to the sub-scanning direction passes through detection window section 330, and T2 obtained in that occasion is shown in FIG. 9(d). As stated above, deviation of a laser beam to the sub-scanning direction is detected as a pulse width. Incidentally, explanation for T3 and T4 will be omitted.

Namely, when T1 is considered as a standard, T2–T1 is a positional deviation of M from Y in the sub-scanning direction, T3–T1 is a positional deviation of C from Y in the sub-scanning direction, and T4–T1 is a positional deviation of K from Y in the sub-scanning direction. Therefore, it is necessary to adjust an amount of such positional deviation with the fine adjustment prism 315 mentioned above.

Results of detection by start position locating sensors 350Y–350K are sent to time measurement circuit 400 through I/V conversion circuit 370, and data of positional deviation in the sub-scanning direction described above are generated at the time measurement circuit 400. The data of positional deviation are sent from the time measurement circuit 400 to timing control circuit 500. The timing control circuit 500 generates data of fine adjustment for C and K, and sends them to microprocessor 320.

Then, the microprocessor 320 drives motor driver 240 to make each fine adjustment prism for M, C and K to rotate through the structure explained above with reference to FIG. 4.

As stated above, deviation in the sub-scanning direction is detected from a difference of a detection pulse width in the case where a laser beam passing through the detection window section first for each color is deviated to the subscanning direction, by the use of the detection window section where edges 331a and 332a on the starting side for main scanning are not in parallel with each other, and this deviation in the sub-scanning direction is corrected by the fine adjustment prism. Thus, deviation in the sub-scanning direction is solved and accurate registration can be conducted.

Incidentally, FIGS. 10(a)–10(d) show occasions wherein a detection window section where edges 331a and 332a on the starting side for main scanning are not in parallel with each other is utilized.

Figure 10:
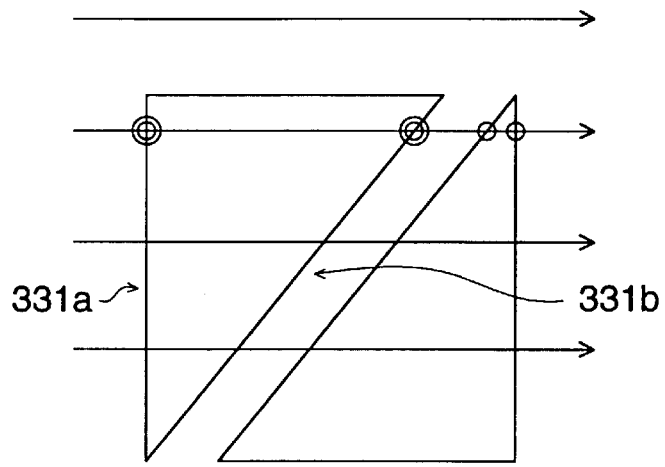
FIGS. 10(*a*) to 10(*d*) are time charts showing the other state of deviation in the sub-scanning direction in an embodiment of the invention.
Figure 10:
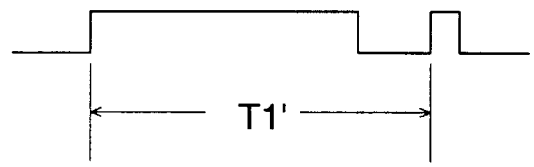
Figure 10:
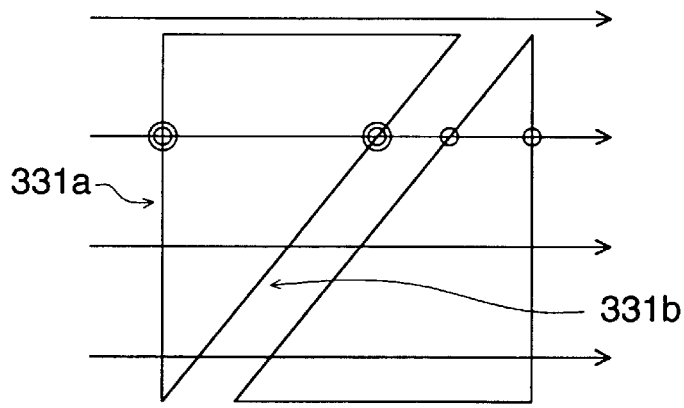
Figure 10:
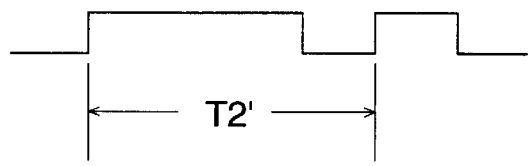

FIG. 10(a) shows an example of the occasion where a laser beam for Y passes through detection window section 330, and FIG. 10(b) shows T1' obtained in the aforesaid occasion. FIG. 10(c) shows the state wherein the laser beam for M deviated to the sub-scanning direction passes through detection window section 330, and FIG. 10(d) shows T2' obtained in the aforesaid occasion. As stated above, deviation of a laser beam in the sub-scanning direction is detected as a pulse width. Incidentally, explanation for T3' and T4' will be omitted.

As stated above, even in the case where a detection window section in which edge 331a on the starting side for scanning is not in parallel with edge 331b on the ending side for scanning is utilized, deviation to the sub-scanning direction is solved and accurate registration can be conducted by detecting deviation to the sub-scanning direction from a difference of detection pulse width in the case of a laser beam which passes through the detection window section first for each color and is deviated to the sub-scanning direction, and by correcting the deviation in the sub-scanning direction with a fine adjustment prism.

Lastly, exposure operations in the scanning control circuit of the present embodiment will be explained.

FIGS. 11(a)–11(d) are time charts showing operations of FIFO.

Figure 11:
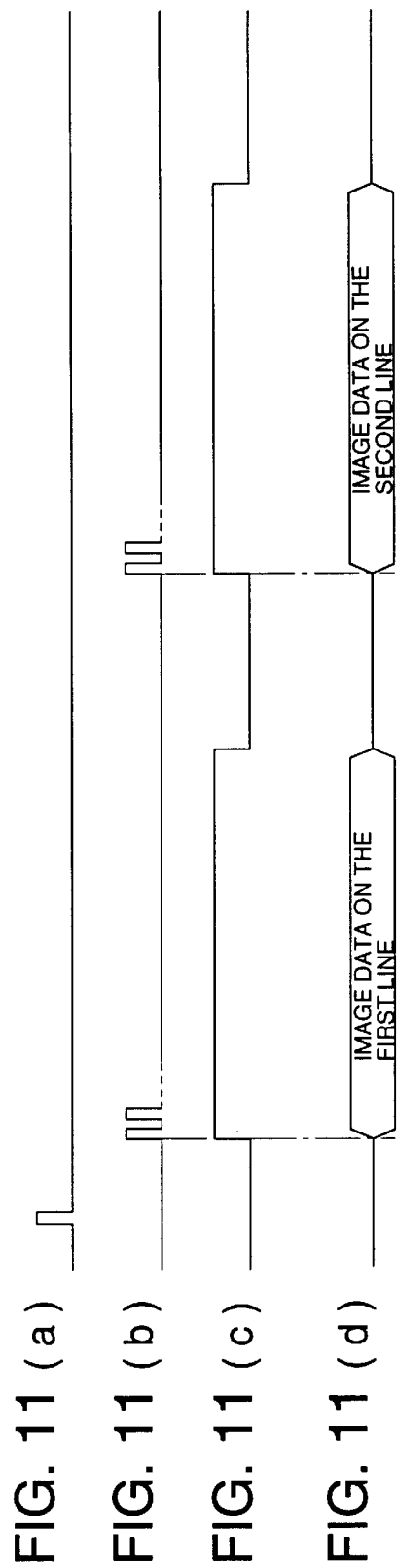
FIGS. 11(*a*) to 11(*d*) are time charts showing the state of operations in an embodiment of the invention.

FIG. 11(a) is one showing read-set signals, and detection signals sent from read-set signal start position locating sensors 350 (350Y–350K) are used.

FIG. 11(b) is one showing delay clock dli having prescribed delay time at time measurement circuit 400, and such clock represents read clock for FIFO 700. FIG. 11(c) is one showing read-enable signal, and such read-enable signal is prepared with an index signal which is sent out from first index sensor 312Y and serves as a standard.

FIG. 11(d) represents image data in a unit of a line read out from FIFO 700, and such image data are sent to modulation circuit 800. The foregoing represents exposure operations of scanning optical system 300 in the present embodiment, and the exposure operations are conducted for each color.

As explained in detail above, an image forming apparatus of the present embodiment can prevent fully, when it is equipped with the aforesaid scanning control circuit, the positional deviations in the main scanning direction and in the sub-scanning direction for images for plural colors.

Incidentally, though an object of the aforesaid embodiment is to prevent deviations in the main scanning direction and the sub-scanning direction, it is also possible to use it for other applications by using the aforesaid den end position locating sensor.

For example, let it be assumed that a scanning laser beam crossing detection window sections 330 and 340 is inclined as shown in FIG. 12(a).

Now, two pulses shown on the left side in FIG. 12(b) are obtained as start position Y by detection window section 330 and start position locating sensor 350Y. Interval T11 between risings of these two pulses is measured by time measurement circuit 400.

Further, two pulses shown on the right side in FIG. 12(b) are obtained as end position Y by detection window section 340 and end position locating sensor 360Y. Interval T12 between risings of these two pulses is measured by time measurement circuit 400.

In this case, a difference between T11 and T12 represents an inclination of a laser beam. By detecting the inclination of a laser beam in the same way even for M, C and K, it is possible to obtain inclination of each color. When such inclination is caused, images each being of each color in four colors are deviated.

When such inclination is detected, therefore, the so-called "image processing with correction of inclination" is conducted. For this purpose, image data equivalent to plural lines are taken in RAM in advance. Then, in the case of exposure (writing), an appropriate address is calculated on a real time basis, and data of the address are read out to be image data for the exposure.

Conducting interpolation processing from plural data of addresses corresponding to plural pixels in the neighborhood without obtaining from one address is more preferable in terms of image quality.

In the case of factory shipments, or as a method of mechanical adjustment conducted by a service engineer, a rotation axis of a polygon motor can be tilted in accordance with detected inclination. Namely, it is considered to adjust by changing the degree of clamping several screws which fix the polygon motor on the apparatus.

Incidentally, it is preferable for adjustment to display the degree of inclination on the display panel.

If an arrangement is made to display a message for service call when inclination arrives at a certain extent in the course of actual operations, it is preferable because a user can find out deterioration of image quality.

An image forming apparatus of the invention equipped with the aforesaid structures makes it possible to materialize an image forming apparatus capable of conducting accurate registration of images each being of a different color out of plural colors both in the main scanning direction and the sub-scanning direction on a real time basis.

What is claimed is:

1. An apparatus for forming a multi-color image, comprising:

a rotatable image carrying member having a peripheral surface;

a plurality of image forming means each having a charging device so that the plurality of image forming means form the multi-color image during a single rotation of the image carrying member on the peripheral surface;

each scanning exposure device of the plurality of image forming means including a beam generator and a polygonal mirror and being controlled such that the polygonal mirror is rotated at a same rotational speed as the other scanning exposure devices and such that a beam scans the peripheral surface in an axial direction of the image carrying member;

a first sensor for detecting the beam passing at a start reference position on the peripheral surface and for outputting a start reference signal;

a second sensor for detecting the beam passing at an end reference position on the peripheral surface and for outputting a stop reference signal;

measuring means for receiving the start reference signal and the stop reference signal sequentially for each scanning exposure device and for measuring a time between the start reference signal and the stop reference signal; and control means for controlling a frequency of clock pulses to transmit image signals for each scanning exposure device based on the measured time of each scanning exposure device;

wherein each scanning exposure device is provided with an index sensor to detect the beam passing at a beam reference position of each scanning exposure device and to output an index signal, the measuring means receives the index signal for each scanning exposure device and measures a time between the index signal and one of the start reference signal and the stop reference signal, and the control means controls a timing to start writing an image with the beam on the peripheral surface for each scanning exposure device.

2. The apparatus of claim 1, wherein the measuring means comprises a time measuring circuit to measure time with accuracy within one pixel clock and a delay circuit to generate n clocks whose phases are changed by 1/n within one pixel clock.

3. The apparatus of claim 1, wherein the control means comprises a FIFO memory to adjust exposure timing at a unit of a pixel clock and a clock selection circuit to adjust a phase of the pixel clock.

4. The apparatus of claim 1, wherein each of the first sensor and the second sensor comprises a window member having one of a light reflecting member and a light transmitting member and detects the beam by light from the window member.

5. The apparatus of claim 3, wherein the window member is provided on an extended surface of the peripheral surface.

6. The apparatus of claim 3 wherein the window member is provided on an extended surface of the peripheral surface.

7. The apparatus of claim 4, wherein one of a light reflecting member and a light transmitting member has a first edge at the scanning start side and a second edge at the scanning stop side and the first edge and the second edge are not parallel to each other, and wherein the measuring means receives two signals corresponding to the first edge and the second edge and measures a time between the two signals and the control means controls a timing in terms of a sub-scanning direction based on the measured time between the two signals.

8. The apparatus of claim 7, wherein the scanning exposure device comprises a fine adjustment prism to conduct fine adjustment of an exposure position within a pixel clock in the sub-scanning direction and the fine adjustment prism is controlled by the control means.

9. The apparatus of claim 4, wherein one of a light reflecting member and a light transmitting member is provided two pieces so as to have a first edge at the scanning start side and a second edge at the scanning start side and the first edge and the second edge are not parallel to each other, and wherein the measuring means receives two signals corresponding to the first edge and the second edge and measures a time between the two signals and the control means controls a timing in terms of a sub-scanning direction based on the measured time between the two signals.

10. An apparatus for forming a multi-color image, comprising:

a rotatable image carrying member having a peripheral surface;

a plurality of image forming means each having a charging device so that the plurality of image forming means form the multi-color image during a single rotation of the image carrying member on the peripheral surface;

each scanning exposure device of the plurality of image forming means including a beam generator and a polygonal mirror and being controlled such that the polygonal mirror is rotated at a same rotational speed as the other scanning exposure devices and such that a beam scans the peripheral surface in an axial direction of the image carrying member;

a first sensor for detecting the beam passing at a start reference position on the peripheral surface and for outputting a start reference signal;

a second sensor for detecting the beam passing at an end reference position on the peripheral surface and for outputting a stop reference signal;

measuring means for receiving the start reference signal and the stop reference signal sequentially for each scanning exposure device and for measuring a time between the start reference signal and the stop reference signal; and control means for controlling a frequency of clock pulses to transmit image signals for each scanning exposure device based on the measured time of each scanning exposure device;

wherein each of the first sensor and the second sensor comprises a window member having one of a light reflecting member and a light transmitting member and detects the beam by light from the window member; and wherein one of a light reflecting member and a light transmitting member has a first edge at the scanning start side and a second edge at the scanning stop side and the first edge and the second edge are not parallel to each other, and wherein the measuring means receives two signals corresponding to the first edge and the second edge and measures a time between the two signals and the control means controls a timing in terms of a sub-scanning direction based on the measured time between the two signals.

11. The apparatus of claim 10, wherein the scanning exposure device comprises a fine adjustment prism to conduct fine adjustment of an exposure position within a pixel clock in the sub-scanning direction and the fine adjustment prism is controlled by the control means.

12. An apparatus for forming multi-color image, comprising:

a rotatable image carrying member having a peripheral surface;

a plurality of image forming means each having a charging device so that the plurality of image forming means form the multi-color image during a single rotation of the image carrying member on the peripheral surface;

each scanning exposure device of the plurality of image forming means including a beam generator and a polygonal mirror and being controlled such that the polygonal mirror is rotated at a same rotational speed as the other scanning exposure devices and such that a beam scans the peripheral surface in an axial direction of the image carrying member;

a first sensor for detecting the beam passing at a start reference position on the peripheral surface and for outputting a start reference signal;

a second sensor for detecting the beam passing at an end reference position on the peripheral surface and for outputting a stop reference signal;

measuring means for receiving the start reference signal and the stop reference signal sequentially for each scanning exposure device and for measuring a time between the start reference signal and the stop reference signal; and control means for controlling a frequency of clock pulses to transmit image signals for each scanning exposure device based on the measured time of each scanning exposure device;

wherein each of the first sensor and the second sensor comprises a window member having one of a light reflecting member and a light transmitting member and detects the beam by light from the window member; and wherein one of a light reflecting member and a light transmitting member is provided two pieces so as to have a first edge at a scanning start side and a second edge at the scanning start side and the first edge and the second edge are not parallel to each other, and wherein the measuring means receives two signals corresponding to the first edge and the second edge and measures a time between the two signals and the control means controls a timing in terms of a sub-scanning direction based on the measured time between the two signals.

* * * * *